May 6, 1969

E. MARCUS 3,442,158

STEPLESS VARIABLE TRANSMISSION

Filed March 21, 1967

INVENTOR
ERNST MARCUS

ATTORNEYS

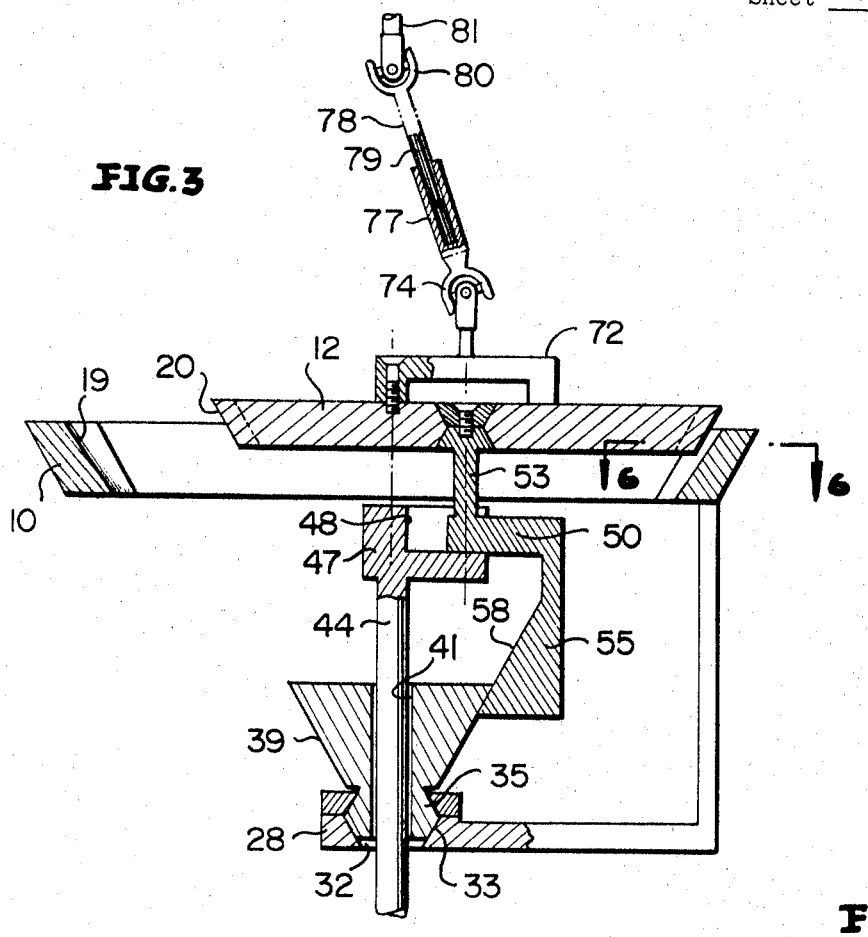
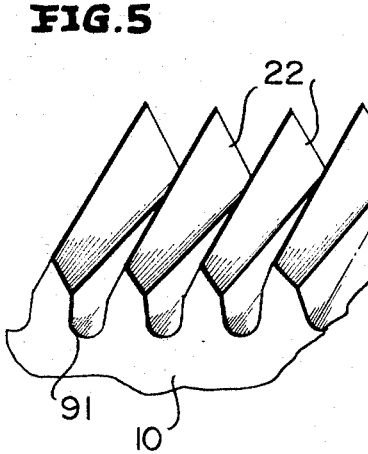
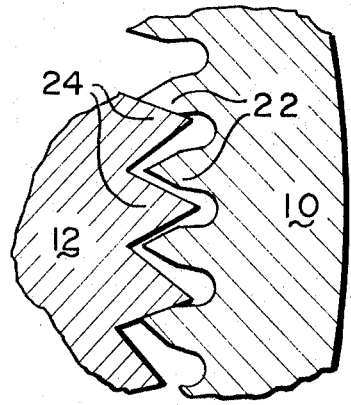
INVENTOR
ERNST MARCUS
BY Hurvitz, Rose & Greene
ATTORNEYS

United States Patent Office 3,442,158
Patented May 6, 1969

3,442,158
STEPLESS VARIABLE TRANSMISSION
Ernst Marcus, Casilla 258,
La Paz, Bolivia
Filed Mar. 21, 1967, Ser. No. 624,911
Int. Cl. F16h *15/50*
U.S. Cl. 74—796                                   11 Claims

ABSTRACT OF THE DISCLOSURE

Gear reduction is achieved between two cooperating inner and outer ring gears, the inner one of which is eccentrically positioned relative to the axis of rotation of the other, the frictional or toothed surfaces of the gears being conically shaped and arranged for relative axial motion with continuous contact therebetween, such that the outer gear presents a variable diameter of cooperating surface to the inner gear as the two gears undergo relative axial movement.

Background of the invention

The present invention relates generally to reduction gear power trains, and more particularly to continuously variable transmissions for power trains, by which gear reduction may be achieved in a simple and efficient configuration.

It is conventional practice to provide transmissions for power trains by which the speed of one portion of the system is increased or reduced relative to another as the transmission is varied in distinct steps. In addition to the relatively jerky or unsmooth manner in which speed changes are effected by these stepped variable transmissions, the transmission system is generally characterized by a large number of moving parts, many of which are moving at high speed.

Summary of the invention

It is a principal object of the present invention to provide improvements in variable transmissions, and more specifically, to provide a stepless variable transmission by which motive power is transferred from one portion of a power train to another in smooth, continuous, linear fashion, and in which small relative movements between components can effect significant speed changes through the power train.

Briefly, according to the present invention, a stepless variable transmission comprises cooperating ring gears, one adapted to rotate within and in partial engagement with the other, the inner gear being arranged for eccentric rotation relative to the axis of the outer gear, and the two gears having conical confronting peripheral surfaces on which the respective teeth, splines or otherwise frictionally engaging areas are located. As the two gears undergo relative rotation their coupling is such that they may also enjoy axial movement relative to one another, such that a differing diameter (tooth or friction surface diameter) of outer gear may be presented to the cooperating or meshing portion of the inner gear. It can be shown that the frictional surface or mating surface diameters, hereinafter referred to also as the "effective" diameters of the gears, determine the ratio of reduction in accordance with the expression $$\frac{2(D_o - D_i)}{D_i} \quad (1)$$

where $D_o$ and $D_i$ are respectively the effective diameter of the outer gear and the effective diameter of the inner gear. Accordingly, variation of $D_o$ with respect to $D_i$, as occurs when the two gears move longitudinally, or axially, relative to one another, varies the ratio of reduction as indicated by expression (1). Moreover, since the difference in effective diameter of the two gears may be decreased to a very small value for slight longitudinal movement between the gears, it is possible to vary the output speed of the power train within wide limits for only narrow limit translational (in contrast to rotational) motion between the gears. In addition, such speed changes are effected by extremely smooth substantially linear translational relative movement of the gears, in "stepless" fashion.

It is therefore another object of the present invention to provide a stepless variable transmission in which a pair of eccentrically related, conical cooperating gears may be selectively moved one within the other, for both relative rotation and relative translation, the translation being in a longitudinal direction (normal to the plane of rotation), while maintaining at least a limited portion of each of their respective cooperating surface areas in frictional engagement, to proportionally vary the ratio of gear reduction.

Brief description of the drawings

The above and still further objects, features and attendant advantages of the present invention will become apparent from a consideration of the following detailed description of a preferred embodiment thereof, especially when taken with the accompanying drawings, in which:

FIGURE 3 is a fragmentary sectional view of the transmission structure taken along the line 3—3 of FIGURE 1;

FIGURE 5 is a fragmentary perspective detail of exemplary teeth of the outer ring gear of FIGURE 1; and FIGURE 6 is a fragmentary sectional view taken along the line 6—6 of frictional engagement or meshing of the cooperating gears of FIGURE 3.

Description of the preferred embodiment

Figure 1:
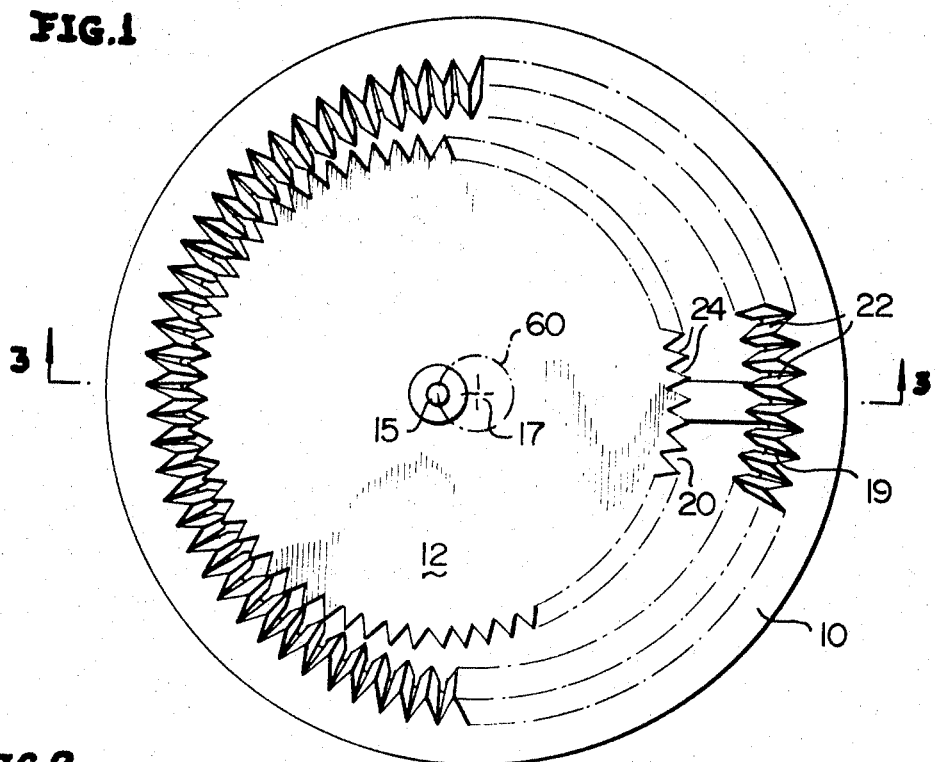
FIGURE 1 is a plan view of the cooperating gears of an embodiment of the variable transmission in accordance with the invention.

Referring now to the drawings in general, and with designation of specific figures as may be necessary, the stepless variable transmission of FIGURES 1–4 includes an outer ring gear 10 and an inner ring gear 12, the latter having an axis of rotation 15 displaced relative to the axis of rotation 17 of the former for eccentricity therewith. Ring gear 10 is thicker than inner gear 12, as shown more clearly in FIGURES 2 and 3, and the respective cooperating surfaces 19, 20 constituting the inner periphery of gear 10 and outer periphery of gear 12 are conical in shape and substantially parallel to one another with the necessary intermeshing or frictionally engaging elements, such as respective teeth 22, 24, located thereon.

As will become more clear from the ensuing description, it is not necessary that conical surfaces 19 and 20 of the two gears be provided with teeth. Rather, splines, knurling or frictional surface area of some other type may be employed according to the nature, particularly the size, of the load coupled to the transmission via the remaining components of the power train.

Outer ring gear 10 is preferably fixed to prevent rotation thereof, but is free to move, along with member 28 which is rigidly fastened to gear 10 via coupling member 30, in a longitudinal direction along its axis. Member 28 is provided with an opening 32 therein, having an axis coincident with axis 17 of outer gear 10, and contains a bearing 33 by which the member is separated from the bearing portion 35 of a conical element 39. The latter is provided with a centrally disposed hole 41 of square cross-section along axis 17 for accommodating rotatable shaft 44, along which cone 39 can move longitudinally, and which shaft may be driven in any convenient and conventional manner (not shown).

Shaft 44 is provided with a channel member 47, in the channel 48 of which is retained a component 50 including a shaft 53 along axis 15, on which inner ring gear 12 rotates, and a portion 55 having an inclined conical peripheral surface 58 mating with the surface of conical element 39 (FIGURE 3).

In operation, as shaft 44 rotates channel member 47 revolves, thereby driving component 50 in revolution about axis 17. As shaft portion or hub 53 of component 50 revolves it describes a circle about axis 17 and forces the teeth 24 of inner ring gear 12 to mesh with teeth 22 of outer gear 10 along a limited region of engagement. This area of engagement, of course, propagates about the inner periphery of gear 12 with the revolving shaft or hub 53, gear 12 rotating freely on the hub to engage surface 19 of gear 10 in a manner characterized by a traveling wave.

Figure 2:
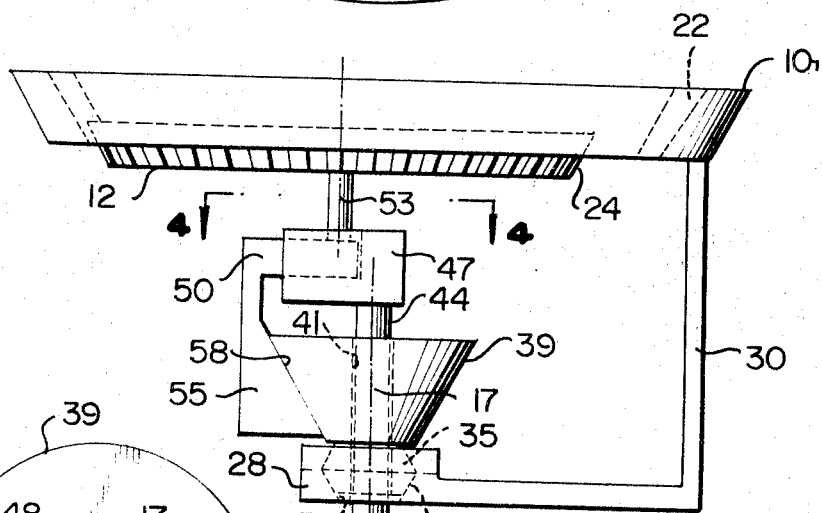
FIGURE 2 is a side view of the transmission structure of FIGURE 1.
Figure 4:
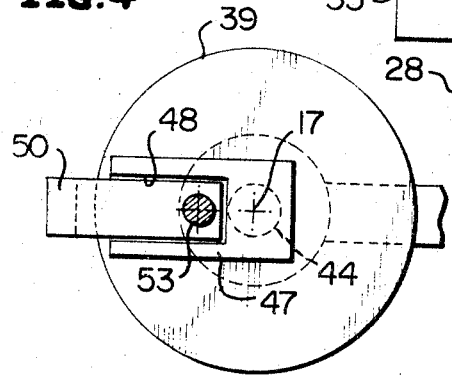
FIGURE 4 is a sectional view taken along the line 4—4 of FIGURE 2.

It will be observed from the figures that if ring gear 10, and thus members 28 and 39, are moved downwardly (or more generally, longitudinally) relative to inner gear 12, e.g., from the relative positions shown in FIGURE 2 to those shown in FIGURE 3, gear 10 gradually and continuously presents a larger effective diameter to gear 12. But component 50, and more specifically portion 55 thereof, is forced outwardly by the longitudinal downward movement of cone 39 (along with gear 10 and connecting member 30), thereby maintaining gear 12 in cooperative engagement with gear 10. In this respect, it should be noted that the plane of rotation of gear 12 is preferably fixed within the system, and that while its hub may be displaced laterally within that plane (perpendicular to axis 17), neither gear 12 nor any component connected thereto may move longitudinally relative to shaft 44. Similarly, if the directions of relative longitudinal movement are reversed, the effective diameter of gear 10 is reduced with respect to gear 12, but the latter being forced inwardly by the upward movement of gear 10, maintains its intermeshed relationship with gear 10. Portion 55 of component 50 correspondingly moves inward relative to axis 17 as a greater portion of its inclined surface 58 is brought against cone 39, which moves upward with gear 10.

Analyzing these relative movements, during rotation of shaft 44 the movement of gear 12 results in its axis 15 describing a circle 60 (FIGURE 1) about the axis 17 of outer gear 10. The diameter of the circle 60 thus described is twice the difference between the effective diameters of the inner and outer ring gears, or $$D_c = 2(D_o - D_i) \quad (2)$$

Each full revolution of ring gear 12 (in a direction opposite that of shaft 44, incidentally) which is also one revolution of output shaft 81 (FIGURE 3), is equal to $n$ revolutions of input shaft 44, where $n$ is the length of the circumference of gear 12 divided by the length of the circumference of circle 60. Dividing by pi ($\pi$), this can be reduced to $$D_i/D_c (\text{r.p.m. of input shaft}) = \text{r.m.p. of output shaft} \quad (3)$$

The ratio of reduction is the fraction $$D_c/D_i \quad (4)$$

Substituting expression (2), this becomes $$\frac{2(D_o - D_i)}{D_i} = \text{ratio of reduction} \quad (1)$$

It is apparent that any change in $D_o$, the effective (or tooth) diameter of outer ring gear 10, will vary the ratio of reduction, and further that even slight changes in $D_o$ result in large ratio reduction, and hence output speed, changes.

The rotation of inner gear 12 may be transferred to an output shaft in any convenient manner, such as by the cardanic connections shown in FIGURE 3. Briefly, circular member 72 is fastened to the surface of gear 12 about axis 15 and in turn is coupled to a two member shaft 77, 79 via interconnected rings 74 and 75. The shaft members are provided with cooperating splined surfaces to permit relative longitudinal (i.e., sliding) movement therebetween. In addition to transferring rotation of inner gear 12 to the output shaft 81, this arrangement compensates for varying degrees of eccentricity of gear 12.

To insure that the cooperating surfaces of the two ring gears (and any frictionally engaging elements thereon) are permitted to slide easily in a longitudinal direction with respect to one another, and that their areas of contact do not nullify the relative changes in effective diameter, these surfaces and surface area should be carefully designed using criteria well known in the pertinent art. In the case of gear teeth, for example, the configuration of FIGURES 5 and 6 is suitable, insuring that teeth 24 of ring gear 12 do not mesh more deeply with teeth 22 of ring gear 10 as gear 10 moves in a direction to increase its effective diameter with respect to gear 12. To this end, the teeth 22 of gear 10 are provided with a small circular bottom portion 91 at the smaller effective diameter end of the ring gear. This portion is gradually reduced in size as the tooth is traversed so that the tooth size, but not its pitch, becomes larger in a lateral direction. Cooperating teeth 24 or ring gear 12 are cut at the same pitch and with uniform size.

It will be observed that only shaft 44, members 39, 47, and 50, undergo relatively high speed rotation. Gear 12 and associated connections to and including the output shaft rotate slowly relative to shaft 44.

While I have described and illustrated one specific embodiment of my invention, it will be clear that variation of the details of construction which are specifically illustrated and described may be resorted to without departing from the spirit and scope of the invention as defined in the appended claims.

I claim:
1. A stepless variable transmission system comprising
a pair of cooperating relatively internal and external ring gears having confronting surfaces arranged for frictional engagement, said internal gear having a smaller outer diameter than the inner diameter of said external gear to permit transverse displacement between the axes thereof when said internal gear is disposed within said external gear, and
means maintaining the axis of rotation of said internal gear at all times parallel to the axis of said external gear to produce mating frictional engagement of said confronting surfaces when brought together, said confronting surfaces of said gears having generally conical shape and being relatively parallel,
said means including means coupling said gears for variable transverse displacement of said axes to vary the eccentricity thereof concurrently with relative movement of said gears in an axial direction, said coupling means including means continuously urging said confronting surfaces of said gears into mating frictional engagement along a portion of each surface irrespective of the orientation of said axes relative to the earth's surface or of rotation of said gears.
2. The invention according to claim 1 wherein said external gear is substantially thicker than said internal gear so that relative longitudinal movement between said gears is accompanied by presentation of a larger effective diameter inner periphery by said external gear to said internal gear.
3. The invention according to claim 1 wherein said gears have a ratio of reduction given by

$$\frac{2(D_o - D_i)}{D_i}$$

where $D_o$ and $D_i$ are the effective diameters of the cooperating surfaces of the external and internal gears, respectively.

4. The invention according to claim 1 wherein said confronting surfaces are respectively provided with integral teeth.

5. The invention according to claim 1 wherein said confronting surfaces are in frictional engagement only along one limited region thereof, and are separated elsewhere.

6. The invention according to claim 5 wherein said limited region of frictional engagement is propagated about the peripheries of said gears as they undergo relative rotation.

7. The invention according to claim 1 wherein said means maintaining said axes parallel to one another further maintains said axes at all times transversely displaced from one another to insure continual eccentricity therebetween.

8. The invention according to claim 1 wherein said coupling means further includes means for eccentrically rotating said internal gear about the axis of said external gear.

9. The invention according to claim 8 wherein said rotating means comprises a first shaft along the axis of said external gear, a second shaft along the axis of and coupled to said internal gear for relative rotation therewith, said first and second shafts undergoing varying degrees of transverse displacement relative to one another via said coupling means.

10. The invention according to claim 9 further including an output shaft coupled to said internal gear for captive rotation therewith.

11. The invention according to claim 10 wherein said external gear is held against rotation and said internal gear is free to rotate on said second shaft, the rotation of said internal gear on said second shaft produced by said mating frictional engagement of said confronting surfaces along a portion thereof while said internal gear is undergoing eccentric rotation about the axis of said external gear.

References Cited

UNITED STATES PATENTS

| 1,642,346 | 9/1927 | Uytjens. | |
| 2,012,629 | 8/1935 | Huppmann | 74—796 X |
| 2,478,227 | 8/1949 | Bannister | 74—796 X |
| 2,490,525 | 12/1949 | Koller | 74—796 |
| 2,931,248 | 4/1960 | Musser | 74—740 |
| 3,227,004 | 1/1966 | Orain | 74—796 |

ARTHUR T. McKEON, *Primary Examiner.*

U.S. Cl. X.R.

74—206